United States Patent
Gray et al.

(10) Patent No.: US 12,533,261 B2
(45) Date of Patent: Jan. 27, 2026

(54) LASER METHODS AND SYSTEMS FOR THE ALIGNED INSERTION OF DEVICES INTO A STRUCTURE OF THE EYE

(71) Applicant: Lensar, Inc., Orlando, FL (US)

(72) Inventors: Gary Gray, Orlando, FL (US); Valas Teuma, Orlando, FL (US); Arthur Newton, Orlando, FL (US)

(73) Assignee: Lensar, Inc., Orlando, FL (US)

( * ) Notice: Subject to any disclaimer, the term of this patent is extended or adjusted under 35 U.S.C. 154(b) by 1577 days.

(21) Appl. No.: 15/702,630

(22) Filed: Sep. 12, 2017

(65) Prior Publication Data

US 2018/0085256 A1  Mar. 29, 2018

Related U.S. Application Data

(60) Provisional application No. 62/393,560, filed on Sep. 12, 2016.

(51) Int. Cl.
*A61F 9/008* (2006.01)
*A61F 2/16* (2006.01)

(52) U.S. Cl.
CPC ........ *A61F 9/00834* (2013.01); *A61F 2/1613* (2013.01); *A61F 2/1662* (2013.01); *A61F 9/0084* (2013.01); *A61F 2002/1683* (2013.01); *A61F 2009/0087* (2013.01); *A61F 2009/00889* (2013.01); *A61F 2230/0065* (2013.01); *A61F 2240/002* (2013.01); *A61F 2250/0097* (2013.01)

(58) Field of Classification Search
CPC .. A61F 9/00834; A61F 2/1662; A61F 9/0084; A61F 2002/1683; A61F 2009/0087; A61F 2230/0065; A61F 2240/002; A61F 2250/0097; A61F 2/1613; A61F 2009/00889

See application file for complete search history.

(56) References Cited

U.S. PATENT DOCUMENTS

| | | | |
|---|---|---|---|
| 4,538,608 A | 9/1985 | L'Esperance |
| 4,764,930 A | 8/1988 | Bille |
| 4,901,718 A | 2/1990 | Bille |
| 4,907,586 A | 3/1990 | Bille |
| 5,098,426 A | 3/1992 | Sklar |
| 5,246,435 A | 9/1993 | Bille |
| 5,355,181 A | 10/1994 | Ashizaki |
| 5,439,462 A | 8/1995 | Bille |
| 5,480,396 A | 1/1996 | Simon |

(Continued)

FOREIGN PATENT DOCUMENTS

JP 2015 029641 2/2015

OTHER PUBLICATIONS

Snapshot from Wayback Machine of Wikipedia Lens (Anatomy). Feb. 2014.*

(Continued)

*Primary Examiner* — Mark W. Bockelman
(74) *Attorney, Agent, or Firm* — Glen P. Belvis; Belvis Law, LLC.

(57) ABSTRACT

Systems, methods and apparatus for replacement of cataractous lenses, the insertions of devices into the eye, and the alignment of IOLs, including toric IOLs. Systems, methods and apparatus for forming laser cut capsulotomies having alignment nubs that are aligned with an astigmatic axis of the eye.

21 Claims, 11 Drawing Sheets

(56) References Cited

U.S. PATENT DOCUMENTS

| | | |
|---|---|---|
| 6,004,314 A | 12/1999 | Wei |
| 6,099,522 A | 8/2000 | Knopp |
| 6,197,018 B1 | 3/2001 | O'Donnell |
| 6,312,422 B1 | 11/2001 | Dubnack |
| 6,322,556 B1 | 11/2001 | Gwon |
| 6,325,792 B1 | 12/2001 | Swinger |
| 7,655,002 B2 | 2/2010 | Myers |
| 8,262,646 B2 | 9/2012 | Frey |
| 8,382,745 B2 | 2/2013 | Naranjo-Tackman |
| 8,394,084 B2 | 3/2013 | Blumenkranz et al. |
| 8,403,921 B2 | 3/2013 | Blumenkranz et al. |
| 8,425,497 B2 | 4/2013 | Blumenkranz et al. |
| 8,465,478 B2 | 6/2013 | Frey |
| 8,480,659 B2 | 7/2013 | Frey |
| 8,500,723 B2 | 8/2013 | Frey |
| 8,617,146 B2 | 12/2013 | Frey |
| 8,758,332 B2 | 6/2014 | Frey |
| 8,801,186 B2 | 8/2014 | Frey |
| 9,180,051 B2 | 11/2015 | Frey |
| 9,375,349 B2 | 6/2016 | Frey |
| 9,545,338 B2 | 1/2017 | Frey |
| 2007/0173794 A1 | 7/2007 | Frey |
| 2008/0287928 A1 | 11/2008 | Arnoldussen |
| 2010/0004641 A1 | 1/2010 | Frey |
| 2012/0265181 A1 | 10/2012 | Frey |
| 2014/0276681 A1 | 9/2014 | Schuele et al. |
| 2014/0343541 A1* | 11/2014 | Scott ............ A61F 9/008 606/4 |
| 2016/0089271 A1* | 3/2016 | Zacharias ....... A61F 9/00834 606/5 |
| 2016/0095752 A1 | 4/2016 | Srinivasan et al. |
| 2016/0302971 A1 | 10/2016 | Morely |
| 2017/0347877 A1 | 12/2017 | Frey |

OTHER PUBLICATIONS

Nov. 7, 2013, Mayer, "Impact of Crystalline Lens Opacification on Effective Phacoemulsification Time in Femtosecond Laser-Assisted Catract Surgery" Am Journ Opthal vol. 157, No. 2, p. 426 (2013).
Jan. 24, 2020, EPO, Exam Report EP 16 780 945.8.
Feb. 2, 2018, PCT, Search Report and Opinion PCT/US2017/051216.
Mar. 31, 2015, Packer, "Defining the ideal femtosecond laser capsulotomy" Br J Opthalmolo 2015:99 1137-1142.
Sep. 26, 2019, TIPO, Office Action TW 106137547 (w/translation).

* cited by examiner

LASER METHODS AND SYSTEMS FOR THE ALIGNED INSERTION OF DEVICES INTO A STRUCTURE OF THE EYE

This application claims under 35 U.S.C. § 119(e)1 the benefit of U.S. provisional application Ser. No. 62/393,560 filed Sep. 12, 2016, the entire disclosure of which is incorporated herein by reference.

BACKGROUND OF THE INVENTION

Field of the Invention

The present invention relates to systems and methods for treating the structure of the human eye, including the natural human crystalline lens with a laser to address a variety of medical conditions such as presbyopia, refractive error and cataracts and combinations of these.

The anatomical structures of the eye are shown in general in FIG. 8, which is a cross sectional view of the eye. The sclera 131 is the white tissue that surrounds the lens 103 except at the cornea 101. The cornea 101 is the transparent tissue that comprises the exterior surface of the eye through which light first enters the eye. The iris 102 is a colored, contractible membrane that controls the amount of light entering the eye by changing the size of the circular aperture at its center (the pupil). The ocular or natural crystalline lens 103, a more detailed picture of which is shown in FIG. 8A, (utilizing similar reference numbers for similar structures) is located just posterior to the iris 102. The terms ocular lens, natural crystalline lens, natural lens, natural human crystalline lens, and lens (when referring to the prior terms) are used interchangeably herein and refer to the same anatomical structure of the human eye.

Generally, the ocular lens changes shape through the action of the ciliary muscle 108 to allow for focusing of a visual image. A neural feedback mechanism from the brain allows the ciliary muscle 108, acting through the attachment of the zonules 111, to change the shape of the ocular lens. Generally, sight occurs when light enters the eye through the cornea 101 and pupil, then proceeds through the ocular lens 103 through the vitreous 110 along the visual axis 104, strikes the retina 105 at the back of the eye, forming an image at the macula 106 that is transferred by the optic nerve 107 to the brain. The space between the cornea 101 and the retina 105 is filled with a liquid called the aqueous 117 in the anterior chamber 109 and the vitreous 110, a gel-like clear substance, in the chamber posterior to the lens 103.

FIG. 8A illustrates, in general, components of and related to the lens 103 for a typical 50-year old individual. The lens 103 is a multi-structural system. The lens 103 structure includes a cortex 113, and a nucleus 129, and a lens capsule 114. The capsule 114 is an outer membrane that envelopes the other interior structures of the lens. The lens epithelium 123 forms at the lens equatorial 121 generating ribbon-like cells or fibrils that grow anteriorly and posteriorly around the ocular lens. The nucleus 129 is formed from successive additions of the cortex 113 to the nuclear regions. The continuum of layers in the lens, including the nucleus 129, can be characterized into several layers, nuclei or nuclear regions. These layers include an embryonic nucleus 122, a fetal nucleus 130, both of which develop in the womb, an infantile nucleus 124, which develops from birth through four years for an average of about three years, an adolescent nucleus 126, which develops from about four years until puberty which averages about 12 years, and the adult nucleus 128, which develops at about 18 years and beyond.

The embryonic nucleus 122 is about 0.5 mm in equatorial diameter (width) and 0.425 mm in Anterior-Posterior axis 104 (AP axis) diameter (thickness). The fetal nucleus 130 is about 6.0 mm in equatorial diameter and 3.0 mm in AP axis 104 diameter. The infantile nucleus 124 is about 7.2 mm in equatorial diameter and 3.6 mm in AP axis 104 diameter. The adolescent nucleus 126 is about 9.0 mm in equatorial diameter and 4.5 mm in AP axis 104 diameter. The adult nucleus 128 at about age 36 is about 9.6 mm in equatorial diameter and 4.8 mm in AP axis 104 diameter. These are all average values for a typical adult human lens approximately age 50 in the accommodated state, ex vivo. Thus this lens (nucleus and cortex) is about 9.8 mm in equatorial diameter and 4.9 mm in AP axis 104 diameter. Thus, the structure of the lens is layered or nested, with the oldest layers and oldest cells towards the center.

The lens is a biconvex shape as shown in FIGS. 8 and 8A. The anterior and posterior sides of the lens have different curvatures and the cortex and the different nuclei in general follow those curvatures. Thus, the lens can be viewed as essentially a stratified structure that is asymmetrical along the equatorial axis and consisting of long crescent fiber cells arranged end to end to form essentially concentric or nested shells. The ends of these cells align to form suture lines in the central and paracentral areas both anteriorly and posteriorly. The older tissue in both the cortex and nucleus has reduced cellular function, having lost their cell nuclei and other organelles several months after cell formation.

Compaction of the lens occurs with aging. The number of lens fibers that grow each year is relatively constant throughout life. However, the size of the lens does not become as large as expected from new fiber growth. The lens grows from birth through age 3, from 6 mm to 7.2 mm or 20% growth in only 3 years. Then the next approximate decade, growth is from 7.2 mm to 9 mm or 25%; however, this is over a 3 times longer period of 9 years. Over the next approximate 2 decades, from age 12 to age 36 the lens grows from 9 mm to 9.6 mm or 6.7% growth in 24 years, showing a dramatically slowing observed growth rate, while we believe there is a relatively constant rate of fiber growth during this period. Finally, in the last approximately 2 decades described, from age 36 to age 54, the lens grows by a tiny fraction of its youthful growth, from 9.6 to 9.8 mm or 2.1% in 18 years. Although there is a geometry effect of needing more lens fibers to fill larger outer shells, the size of the older lens is considerably smaller than predicted by fiber growth rate models, which consider geometry effects. Fiber compaction including nuclear fiber compaction is thought to explain these observations.

In general, presbyopia is the loss of accommodative amplitude. In general refractive error is typically due to variations in the axial length of the eye. Myopia is when the eye is too long resulting in the focus falling in front of the retina. Hyperopia is when the eye is too short resulting in the focus falling behind the retina. In generally, cataracts are areas of opacification of the ocular lens which are sufficient to interfere with vision. Other conditions, for which the present invention is directed, include but are not limited to the opacification of the ocular lens.

Presbyopia most often presents as a near vision deficiency, the inability to read small print, especially in dim lighting after about 40-45 years of age. Presbyopia, or the loss of accommodative amplitude with age, relates to the eyes inability to change the shape of the natural crystalline lens, which allows a person to change focus between far and near, and occurs in essentially 100% of the population.

Accommodative amplitude has been shown to decline with age steadily through the fifth decade of life.

In general, current presbyopia treatments tend to be directed toward alternatives to increasing the amplitude of accommodation of the natural crystalline lens. These treatments include a new class of artificial accommodative Intraocular Lenses (IOL's), such as the Eyeonics CRYSTAL-ENS, which are designed to change position within the eye; however, they offer only about 1 diopter of objectively measured accommodative amplitude, while many practitioners presently believe 3 or more diopters are required to restore normal visual function for near and far objects. Moreover, researchers are pursuing techniques and materials to refill the lens capsule with synthetic materials. Additionally, present surgical techniques to implant artificial accommodative IOL's are those developed for the more serious condition of cataracts. It is believed that practitioners are reluctant at the present time to replace a patient's clear albeit presbyopic natural crystalline lens, with an accommodative IOL due to the risks of this invasive surgical technique on a patient who may simply wear reading glasses to correct the near vision deficiency. However, developments may offer greater levels of accommodative amplitude in implantable devices and refilling materials.

SUMMARY

There has existed a long standing need for improved methods of increasing the efficacy of treatments for cataracts, including improved capsulotomies, removal of the natural lens, placement of IOLs, and alignment of toric IOLs. The present inventions, among other things, solve these and other needs by providing the articles of manufacture, devices and processes set forth in this specification, drawings and claims.

There is provided a system for performing an opening the a structure of the eye for inserting an intraocular device into the eye, the system including: a therapeutic laser for generating a therapeutic laser beam; data identifying the position of an astigmatic axis of an eye; (preferably the data identifying the position should be with respect to axis in the eye and in relation to the laser system its self) an alignment nub laser capsulotomy laser shot pattern for delivery of the therapeutic laser beam to an anterior capsule of a lens of the eye, the pattern including a capsulotomy pattern defining a center of the pattern, wherein the capsulotomy pattern including a first and a second nub, wherein the nubs are aligned with the astigmatic axis of the eye; and, the nubs extend inwardly toward the center of the pattern, and the nubs define a depth of about 0.1 mm to about 1 mm, a sweep of about 5° to about 35°, and a fillet of about 0.1 mm to about 0.7 mm.

There is provided these methods, apparatus and systems having one or more of the following features: wherein the nubs are on the astigmatic axis; wherein the nubs are within 5° of the astigmatic axis; wherein the nubs are within 10° of the astigmatic axis; wherein the sweep is 10° or less, whereby the nubs, upon being formed in the lens capsule, enable a qualitative alignment of a toric IOL in the capsule of the lens of the eye; wherein upon delivery of the laser beam pattern to a lens capsule of the eye, a capsular rim is formed having a strength of about 180 mN; wherein upon delivery of the laser beam pattern to the lens capsule of the eye, a capsular rim is formed having a strength of about 178 to about 182 mN; wherein the astigmatic axis is an induced astigmatic axis; wherein the astigmatic axis is determined after removal of the natural human lens; wherein the astigmatic axis is determined before the removal of the natural human lens of the eye; including aligning a mark on a toric IOL with at least one nub in the alignment nub capsulotomy.

Yet further there is provided a method of aligning a laser shot pattern to an anterior surface of a lens capsule of an eye, the method including: providing to a laser system data for a position of an astigmatic axis of an eye; aligning a laser beam shot pattern with the astigmatic axis of the eye; and, the laser beam shot pattern including an alignment nub laser capsulotomy laser shot pattern for delivery of the therapeutic laser beam to an anterior capsule of a lens of the eye, the pattern including a capsulotomy pattern defining a center of the pattern, wherein the capsulotomy pattern including a first and a second nub, and wherein the nubs extend inwardly toward the center of the pattern, and the nubs define a depth of about 0.1 mm to about 1 mm, a sweep of about 5° to about 35°, and a fillet of about 0.1 mm to about 0.7 mm; whereby nubs are aligned with the position of the astigmatic axis of the eye.

Still further there is provided a method of delivering a laser shot pattern to an anterior surface of a lens capsule of an eye, the method including: providing to a laser system data for a position of an astigmatic axis of an eye; aligning a laser beam shot pattern with the astigmatic axis of the eye; the laser beam shot pattern including an alignment nub laser capsulotomy laser shot pattern for delivery of the therapeutic laser beam to an anterior capsule of a lens of the eye, the pattern including a capsulotomy pattern defining a center of the pattern, wherein the capsulotomy pattern including a first and a second nub, and wherein the nubs extend inwardly toward the center of the pattern, and the nubs define a depth of about 0.1 mm to about 1 mm, a sweep of about 5° to about 35°, and a fillet of about 0.1 mm to about 0.7 mm; whereby nubs are aligned with the position of the astigmatic axis of the eye; and, delivering a therapeutic laser beam in the laser beam shot pattern to the anterior surface of the capsule of the lens, thereby forming an alignment nub capsulotomy.

DESCRIPTION OF THE PREFERRED EMBODIMENTS

In general, embodiments of the present inventions provide systems and methods for addressing conditions of the eye, through the aligned insertion of devices into the eye, and in particular, addresses refractive error, induced and naturally occurring, presbyopia, cataracts and opacifications of the natural crystalline lens.

In general, embodiments of the present inventions provide for the placement of laser shots in predetermined pattern to facilitate or provide for the aligned insertion of an intraocular device, such as a inlays, rings, intrastromal ring, or IOLs, where the predetermined pattern has alignment indicators as well as forms an opening for receiving the intraocular device, and the device has alignment marking for alignment with the alignment indicators during insertion. In particular, embodiments relate to predetermined capsulotomy patterns to provide a first and a second alignment indicators, in the shape of nubs, in the pattern, such that the nubs are aligned with an astigmatic axis of the eye. The nubs then provide a reference point for the placement and alignment of IOLs, and in particular toric IOLs in the lens capsule of the eye.

Figure 6:
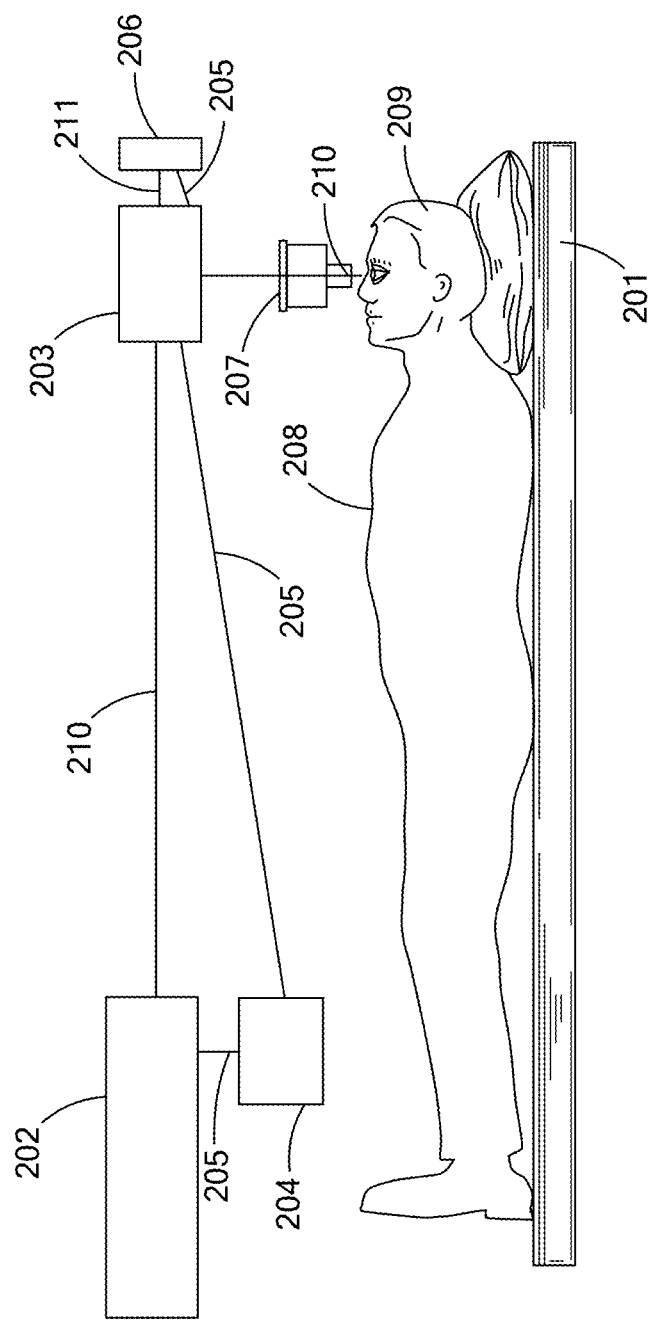
FIG. 6 is a block schematic diagram of a type of system for delivering a laser beam shot pattern to the lens of an eye according to the teachings of the present inventions.

An embodiment of a laser system for performing alignment nub capsulotomies is generally shown in FIG. 6, where there is provided a system for delivering a laser beam shot pattern to the lens of an eye comprising: a patient support 201; a laser 202; optics for delivering the laser beam 203; a control system for delivering the laser beam to the lens in a particular pattern 204, which control system 204 is associated with and/or interfaces with the other components of the system as represented by lines 205; a means for determining the position of lens with respect to the laser 206, which means 206 receives an image 211 of the lens of the eye; and a laser patient interface 207.

The patient support 201 positions the patient's body 208 and head 209 to interface with the optics for delivering the laser beam 203.

In general, the laser 202 should provide a beam 210 that is of a wavelength that transmits through the cornea, aqueous and lens. The beam should be of a short pulse width, together with the energy and beam size, to produce photodisruption. Thus, as used herein, the term laser shot or shot refers to a laser beam pulse delivered to a location that results in photodisruption. As used herein, the term photodisruption essentially refers to the conversion of matter to a gas by the laser. In particular, wavelengths of about 300 nm to 2500 nm may be employed. Pulse widths from about 1 femtosecond to 100 picoseconds may be employed. Energies from about a 1 nanojoule to 1 millijoule may be employed. The pulse rate (also referred to as pulse repetition frequency (PRF) and pulses per second measured in Hertz) may be from about 1 KHz to several GHz. Generally, lower pulse rates correspond to higher pulse energy in commercial laser devices. A wide variety of laser types may be used to cause photodisruption of ocular tissues, dependent upon pulse width and energy density. Thus, examples of such lasers would include: the Delmar Photonics Inc. Trestles-20, which is a Titanium Sapphire (Ti:Sapphire) oscillator having a wavelength range of 780 to 840 nm, less than a 20 femtosecond pulse width, about 100 MHz PRF, with 2.5 nanojoules; the Clark CPA-2161, which is an amplified Ti:Sapphire having a wavelength of 775 nm, less than a 150 femtosecond pulse width, about 3 KHz PRF, with 850 microjoules; the IMRA FCPA (fiber chirped pulse amplification) µjewel D series D-400-HR, which is a Yb:fiber oscillator/amplifier having a wavelength of 1045 nm, less than a 1 picosecond pulse width, about 5 MHz PRF, with 100 nanojoules; the Lumera Staccato, which is a Nd:YVO4 having a wavelength of 1064 nm, about 10 picosecond pulse width, about 100 KHz PRF, with 100 microjoules; and, the Lumera Rapid, which is a ND:YVO4 having a wavelength of 1064 nm, about 10 picosecond pulse width, and can include one or more amplifiers to achieve approximately 2.5 to 10 watts average power at a PRF of between 25 kHz to 650 kHz and also includes a multi-pulsing capability that can gate two separate 50 MHz pulse trains. and, the IMRA FCPA (fiber chirped pulse amplification) pJewel D series D-400-NC, which is a Yb:fiber oscillator/amplifier having a wavelength of 1045 nm, less than a 100 picosecond pulse width, about 200 KHz PRF, with 4 microjoules. Thus, these and other similar lasers may be used a therapeutic lasers.

In general, the optics for delivering the laser beam 203 to the natural lens of the eye should be capable of providing a series of shots to the natural lens in a precise and predetermined pattern in the x, y and z dimension. The optics should also provide a predetermined beam spot size to cause photodisruption with the laser energy reaching the natural lens. Thus, the optics may include, without limitation: an x y scanner; a z focusing device; and, focusing optics. The focusing optics may be conventional focusing optics, and/or flat field optics and/or telecentric optics, each having corresponding computer controlled focusing, such that calibration in x, y, z dimensions is achieved. For example, an x y scanner may be a pair of closed loop galvanometers with position detector feedback. Examples of such x y scanners would be the Cambridge Technology Inc. Model 6450, the SCANLAB hurrySCAN and the AGRES Rhino Scanner. Examples of such z focusing devices would be the Phsyik International Peizo focus unit Model ESee Z focus control and the SCAN LAB varrioSCAN.

In general, the control system for delivering the laser beam 204 may be any computer, controller, and/or software hardware combination that is capable of selecting and controlling x y z scanning parameters and laser firing. These components may typically be associated at least in part with circuit boards that interface to the x y scanner, the z focusing device and/or the laser. The control system may also, but does not necessarily, have the further capabilities of controlling the other components of the system as well as maintaining data, obtaining data and performing calculations. Thus, the control system may contain the programs that direct the laser through one or more laser shot patterns.

In general, the means for determining the position of the lens with respect to the laser 206 should be capable of determining the relative distance with respect to the laser and portions of the lens, which distance is maintained constant by the patient interface 207. Thus, this component will provide the ability to determine the position of the lens with respect to the scanning coordinates in all three dimensions. This may be accomplished by several methods and apparatus. For example, x y centration of the lens may be accomplished by observing the lens through a co-boresighed camera system and display or by using direct view optics and then manually positioning the patients' eye to a known center. The z position may then be determined by a range measurement device utilizing optical triangulation or laser and ccd system, such as the Micro-Epsilon opto NCDT 1401 laser sensor and/or the Aculux Laser Ranger LR2-22. The use of a 3-dimensional viewing and measurement apparatus may also be used to determine the x, y and z positions of the lens. For example, the Hawk 3 axis non-contact measurement system from Vision Engineering could be used to make these determinations. Yet a further example of an apparatus that can be used to determine the position of the lens is a 3-dimension measurement apparatus. This apparatus would comprise a camera, which can view a reference and the natural lens, and would also include a light source to illuminate the natural lens. Such light source could be a structured light source, such as for example a slit illumination designed to generate 3-dimensional information based upon geometry. Further one, two, three, four or more, light sources can be positioned around the eye and the electronically activated to provide multiple views, plainer images, of the eye, and in particular the cornea and the lens, at multiple planar slices that can them be integrated to provide data for position and location information relative to the laser system about those structures.

A further component of the system is the laser patient interface 207. This interface should provide that the x, y, z position between the natural lens and the laser remains fixed during the procedure, which includes both the measurement steps of determining the x y z position and the delivery step of delivering the laser to the lens in a shot pattern. The interface device may contain an optically transparent applanator. One example of this interface is a suction ring applanator that is fixed against the outer surface of the eye and is then positioned against the laser optical housing, thus fixing the distance between the laser, the eye and the natural lens. Reference marks for the 3-dimensional viewing and measuring apparatus may also be placed on this applanator. Moreover, the interface between the lower surface of the applanator and the cornea may be observable and such observation may function as a reference. A further example of a laser patient interface is a device having a lower ring, which has suction capability for affixing the interface to the eye. The interface further has a flat bottom, which presses against the eye flattening the eye's shape. This flat bottom is constructed of material that transmits the laser beam and also preferably, although not necessarily, transmits optical images of the eye within the visible light spectrum. The upper ring has a structure for engaging with the housing for the laser optics and/or some structure that is of known distance from the laser along the path of the laser beam and fixed with respect to the laser. Further examples of such devices are generally disclosed in U.S. Pat. No. D462442, U.S. Pat. No. D462443, and U.S. Pat. No. D459807S, the disclosures of which are hereby incorporated by reference.

It is preferred that the interface may be a corneal shaped transparent element whereby the cornea is put into direct contact with the interface or contains an interface fluid between. Examples of patient interfaces devices are disclosed and taught in US Patent Application Publication Nos. 2010/0022994, 2011/0022035 and 2015/0088175, the entire disclosures of each of which are incorporated herein by reference.

Systems methods and apparatus for performing laser operations on the eye are disclosed and taught in US patent application Publication Nos. 2016/0302971, 2015/0105759, 2014/0378955, and U.S. Pat. Nos. 8,262,646 and 8,708,491, the entire disclosures of each of which are incorporated herein by reference.

Figure 7:
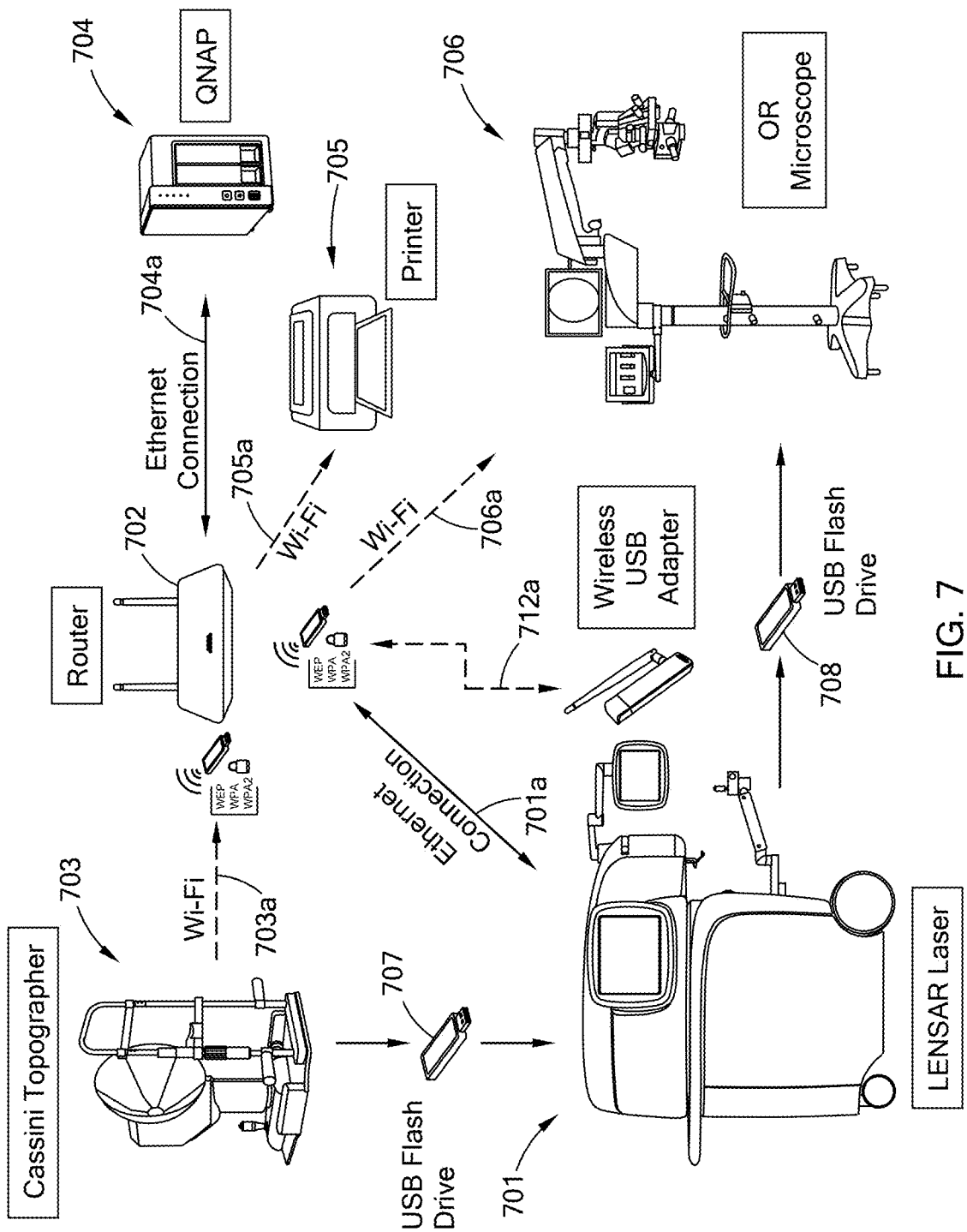
FIG. 7 shows an embodiment of a networked laser system in accordance with the present inventions.
Figure 8:
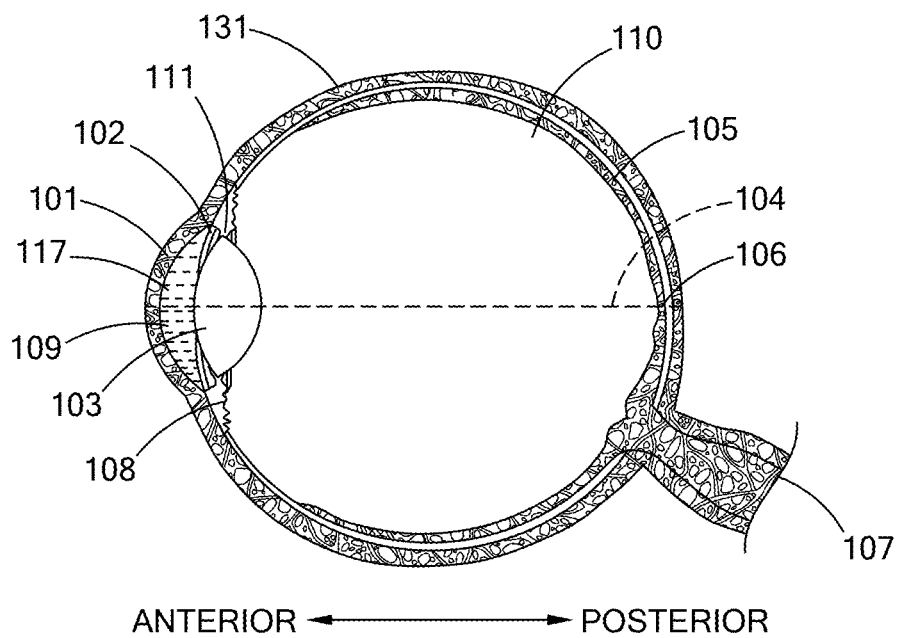
FIGS. 8 and 8A are cross sectional representations of the human eye.
Figure 8A:
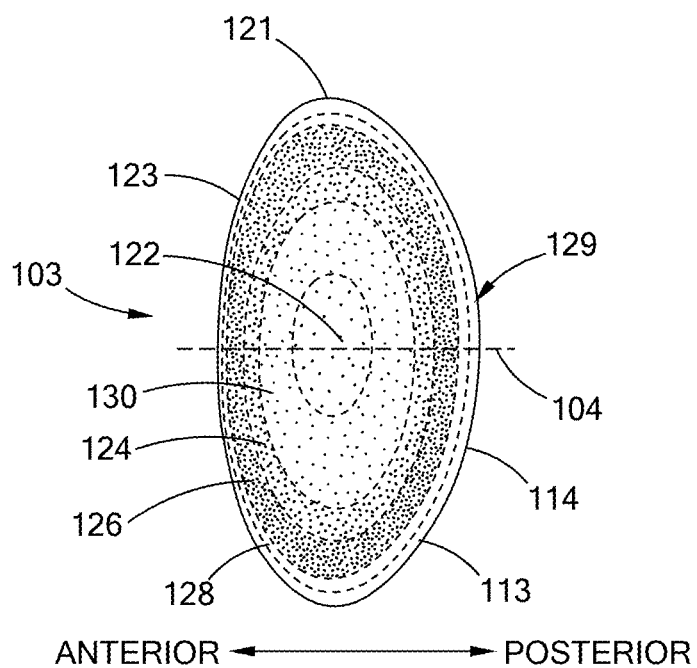

An embodiment of a network system for performing the alignment nub capsulotomies of the present inventions is provided in FIG. 7. This embodiment is a network, wherein the laser surgery system 701 is in communication with a Wi-Fi router 702. This may be by either an Ethernet connection 701a or Wi-Fi connection 702a or both. The router 702 is in turn in communication with a Cassini Topographer 703, A QNAP server 704, a printer 705, and an OR Microscope 706. The router is linked to these devices along communication pathways 703a, 704a, 705a, and 706a, respectively. This communication may be done either via a Wi-Fi connection, Ethernet link, other automation or data communication systems and combinations and variations of these. Data may be exchanged between the laser 701 and the Cassini Topographer 703 and the OR Microscope 706 via the use of USB Memory Sticks 707 or flash drive 708. This network may optionally include other devices useful in a hospital or a medical office, including personal computers or mobile devices. The network may download and/or upload a patient's medical history to a remote server. This information may include previously-acquired data regarding the patient's iris, and may be used by the system to ensure that the scanned iris belongs to the patient for whom the current treatment plan was developed. Other embodiments of combinations of the devices in this network are contemplated by the present inventions.

Laser systems have predetermined laser shot patterns for providing a laser beam in a capsulotomy shot pattern to the anterior capsule of the natural human crystalline lens. The laser shot pattern can be stored in the laser system memory or associated laser system control system. The laser beam shot delivery pattern, is delivered to the anterior surface of the lens capsule to cut an opening in the capsule, forming a capsulotomy.

The capsulotomy is typically and generally circular, however, it should be understood that elliptical and other shapes may be used in conjunction with the alignment nubs.

The astigmatic axis of the eye is provided to the laser system. The axis can be determined by the laser system, having integral systems to determine the astigmatic axis, by a separate device to make this determination, or prior to laser surgery at a remote device where the information about the astigmatic axis of the eye is provided to the laser system, and combinations and variations of these. The astigmatic axis (e.g., the axis of astigmatism) can be determined before, during, or after, the removal of lens material by, for example, topographically mapping the structures of an eye.

As part of the capsulotomy, alignment indicators or "nubs" are formed in the capsular rim. The capsular rim is the rim or edge of the opening formed by the section of lens capsule remaining after the capsulotomy is performed. Thus, the laser beam shots are delivered in the laser beam pattern to perform the capsulotomy cut through the lens capsule. These nubs are preferably placed on opposite sides of the capsular rim along the determined axis of astigmatism. However, it is understood that the nubs can be placed in any known and predetermined relationship to the astigmatic axis. In this manner the nubs form reference points for the alignment of implants into the lens of the eye, IOLs and in particular toric IOLs.

These nubs can be viewed as appendages having predetermined shapes and sizes that extend inwardly from the circular capsulotomy rim and provide reference points to assist surgeons in accurately aligning toric IOL marks along the axis of astigmatism. The shape and size of the nubs can provide both qualitative reference, i.e., is the IOL aligned with the astigmatic axis, and quantitative reference, i.e., within how many degrees of the astigmatic axis is the IOL aligned.

In an embodiments the orientation of the alignment indicators is automatically computed using, in part, data regarding the topographic mapping of a patient's eye, an iris registration method, as well as calculations based on the average surgically-induced astigmatism for a patient's demographic. For example, this demographic information may include, but is not limited to, Nichamin, Johnson and Woodcock monograms.

Before surgery, the system may generate a 3-D model of the eye using, in part, data collected from the eye. This model includes the location of structures including the lens, the astigmatic axis, and any cataracts that may be present. Then, the system may use planning tables, demographic data regarding the patient, including Burd modeling, and the 3-D model to calculate a post-surgical axis of astigmatism, biometry, and topography of the eye. Alternatively, the post-surgical axis of astigmatism may be calculated using the 3-D modeling techniques mentioned above. The system may then automatically align the appendages along the axis of astigmatism. A surgeon may choose to factor either the pre-surgical or post-surgical axis of astigmatism when deciding where to place the alignment indicators.

Figure 1A:
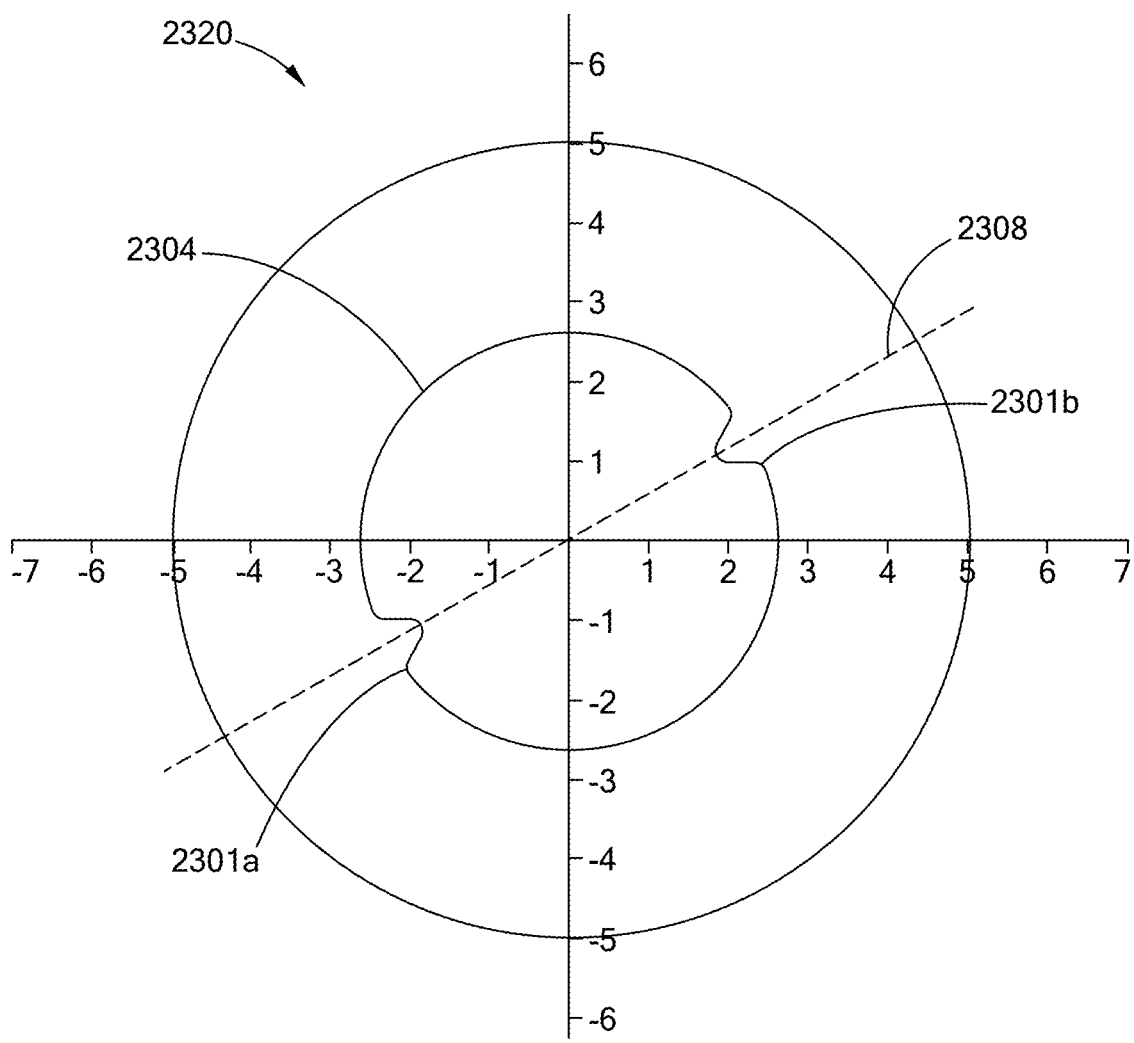
FIG. 1A is a schematic image of an embodiment of an alignment nub capsulotomy, and cut pattern, to aid in the placement of an IOL along an axis of astigmatism in accordance with the present inventions.

FIG. 1A shows a schematic plan view of the lens 2320 of the eye, having an embodiment of a laser alignment nub capsulotomy 2304 and its laser delivery pattern 2304-1 (which are coincident in the drawing). The capsulotomy rim 2304a is formed by the remaining lens capsule material 2304b; and the rim 2304a forms or borders the opening 2304c (e.g., the capsular opening) that is formed when the lens capsular material is removed after the laser cut from delivery of the laser beam shot pattern is performed. (In later figures it being understood that the laser beam shot delivery pattern, the capsulotomy and the capsular rim are coincident, and for ease of reference, will only be referred to with a single reference number and line)

Alignment nubs 2301a and 2301b are part of the laser beam delivery pattern 2304-1 and are formed in the capsulotomy 2304, and thus, also from a part of the capsulotomy rim 2304a. The nubs 2301a, 2301b are aligned with the astigmatic axis 2308 of the eye, and are on opposite sides of the points where that axis crosses the capsulotomy. The nubs have apexes, 2361, 2362.

In this embodiment the nubs 2301a, 2301b, are formed from remaining lens capsule material 2304b, and extend inwardly from the generally circular shape of the opening 2304c, and into the lens capsule opening 2304c. Thus, the laser shot pattern provides a cut that results in the remaining lens capsule material 2304b extending into the capsular opening 2304c forming the alignment nubs 2301a, 2301b. In this embodiment the alignment nubs also extend toward the center of the eye and toward the optical axis of the eye.

Figure 1B:
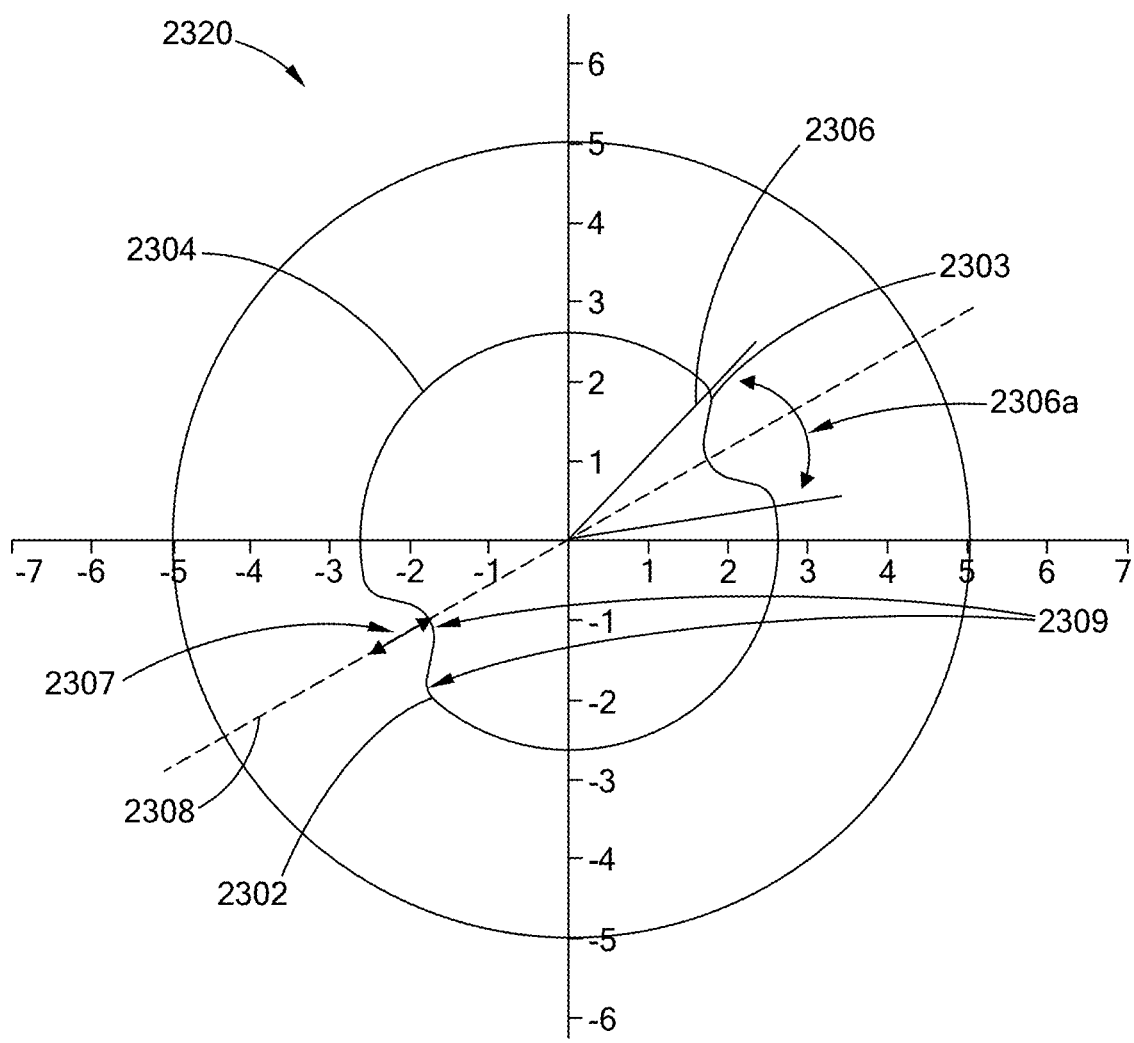
FIG. 1B is a schematic image of an embodiment of an alignment nub capsulotomy, and cut pattern, to aid in the placement of an IOL along an axis of astigmatism in accordance with the present inventions.

The center or center point, of the capsulotomy patterns in FIGS. 1A and 1B are located at the 0 point on the x-axis and y-axis of those figures, i.e., where the two axes cross.

The geometries of each nub can be the same or they can be different. One nub may be used, two nubs at the points where the the astigmatic axis crosses the capsulotomy cut is preferred, and additional nubs, 3, 4 etc., may be used, and may be positioned in other predetermined locations with respect to the astigmatic axis. Additionally, one or more of the nubs can extend into the opening or away from the opening. A surgeon may select the geometries of each alignment indicator, e.g., nub, these geometries may be automatically selected by the system, these geometries can be based, in part, on preferred geometries, they can be based in part on the patient's age, and they can be based on combinations and variations of these and other factors.

Turning to FIG. 1B, there is provided a plan view of a lens 2320 of an eye having an alignment nub laser capsulotomy 2304, having nubs 2302 and 2303. The alignment nubs 2302, 2303 are aligned with the astigmatic axis 2308 of the eye. The nub's have a predetermined geometry (i.e., size and shape), which includes a depth shown by double arrow 2307, sweep (defined by a sweep angle 2306 and double arrow 2306a), and fillet (e.g., tightness) defined by the shape and distance of the cut or nub shape between arrows 2309.

The cut's depth is the measurement of difference between the nub's apex and the radius of the capsular rim, as illustrated by double arrow 2307. The depth can be between about 0.1mm-about 1mm, can be from 0.1 mm to 0.4 mm, and can be from 0.2 mm to 0.7 mm. In preferred embodiments the depth is 0.3 mm, about 0.3 mm, and is from 0.25 mm to 0.35 mm. Although, greater and smaller distances are contemplated, as well. (As used herein the term "about" would include 10% of the stated value, the instrumental error associated with measuring or determining that value, or the larger of the two.)

The nub's sweep is the angle 2306 as measured by double arrow 2306a formed by the nub, between the points where the nub, or nub's cut, initially extends away from the general pattern (typically circular) of the capsulotomy 2304. The nub's sweep can be from about 5° to about 35°. Although larger and smaller sweeps are contemplated. The nub's sweep can be from 5° to 20°, can be from 10° to 40°, can be from 15° to 25°, can be about 5°, can be about 3° to about 7°, and can be about 10°.

The nub, and in particular, the apex of the nub is a predetermined distance, typically as measured by degrees along the curve of the circular capsulotomy, from an astigmatic axis of the eye. The nub, and the nub apex, can be on an axis of astigmatism 2308 (i.e., the nub apex is less than about 1° away from the axis), within about 5° to about 10° of an axis of astigmatism, within about 5° of an axis of astigmatism, within about 7° of an axis of astigmatism, and within about 10° of an axis of astigmatism. Most preferably, the nub is within 10° of the post-surgical axis of astigmatism. Although different predetermined or known, distances and degrees from the axis are contemplated.

The tightness of the cut, e.g., the "fillet", is the linear length between the alignment indicator's apex and the capsular rim (i.e., the distance or length of the cut segment between arrows 2309). The cut's tightness, or fillet, influences the stability of the capsular region and the overall capsule stability. The fillet can be between about 0.1 mm to about 0.5 mm, can be between 0.1 mm to 0.5 mm, can be about 0.2 to about 0.7 mm, can be about 0.1 mm, about 0.2 mm, about 0.25 mm and about 0.4 mm. Preferably the cut's fillet is 0.2 mm.

The geometry for an embodiment of a cut having a depth of about 0.3 mm, a sweep of about 5° to 10°, and a fillet of about 0.2 mm, is an example of a shape and size of a nub that balances the needs, for an alignment indicator of the proper geometry for IOL alignment with the need to preserve optimal capsular strength. The cut's filleting also decreases sharp edges, which minimizes stress focal points and helps preserve capsular strength while minimizing the risk of tissue tearing during implantation and manipulation of an IOL. Also, the alignment indicators, e.g., nubs, are preferably symmetrical, with the same depth, sweep, and fillet, and both within 10° of the axis of astigmatism, with the axis of astigmatism acting as an axis of symmetry. Alignment indicators of differing geometries are contemplated.

Figure 2A:
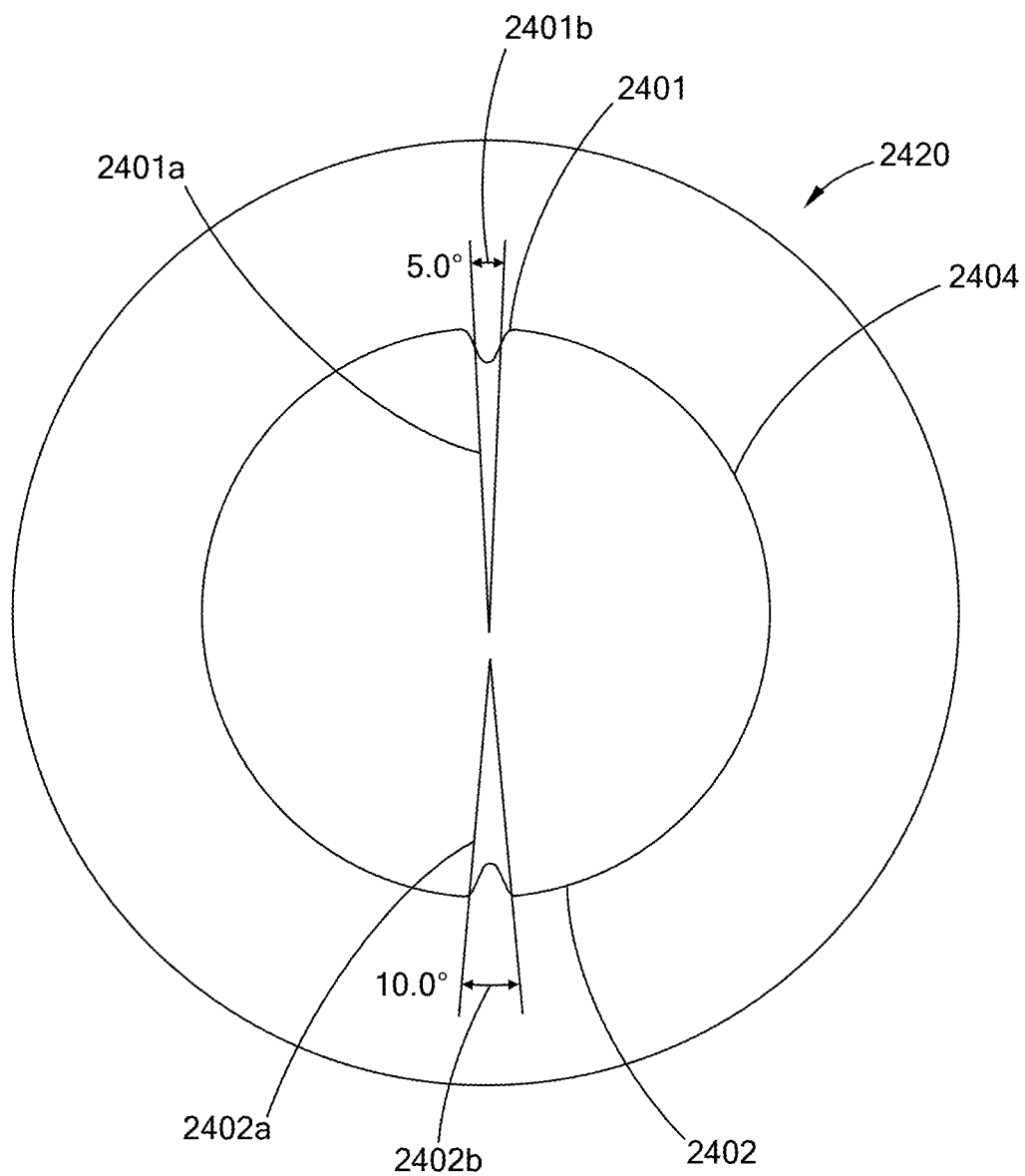
FIG. 2A is a schematic image of an embodiment of an alignment nub capsulotomy, and cut pattern, to aid in the placement of an IOL along an axis of astigmatism in accordance with the present inventions.

FIG. 2A shows a plan for a capsulotomy 2404 with nub 2401 with cut sweep of 5° as defined by angle 2401a and arc 2401b, and nub 2402 with cut sweep of 10° as defined by angle 2402a and arc 2402b. Nub 2402 is a 10° cut that allows for insertion of an IOL, when the nub apex is on the astigmatic axis, within 5° of the axis of astigmatism (not shown in the figure), based upon the typical size of the markings on the IOL. Thus, the sweep of the nub provides, what can be viewed as the width of a runway, or runway markers where the axis indicators of the toric IOL can be landed, or aligned. In this manner a 10° sweep nub can typically provide an accuracy of about 5° (e.g., the nub is providing quantitative measurement of, or information about, the placement of the IOL). In this manner a 5° sweep nub can typically provide an accuracy of about 1° or more. Upon delivering the laser beam shot pattern as provided in the laser beam plan, e.g., FIG. 4, an alignment nub capsulotomy will be formed as shown by 2404.

Figure 2B:
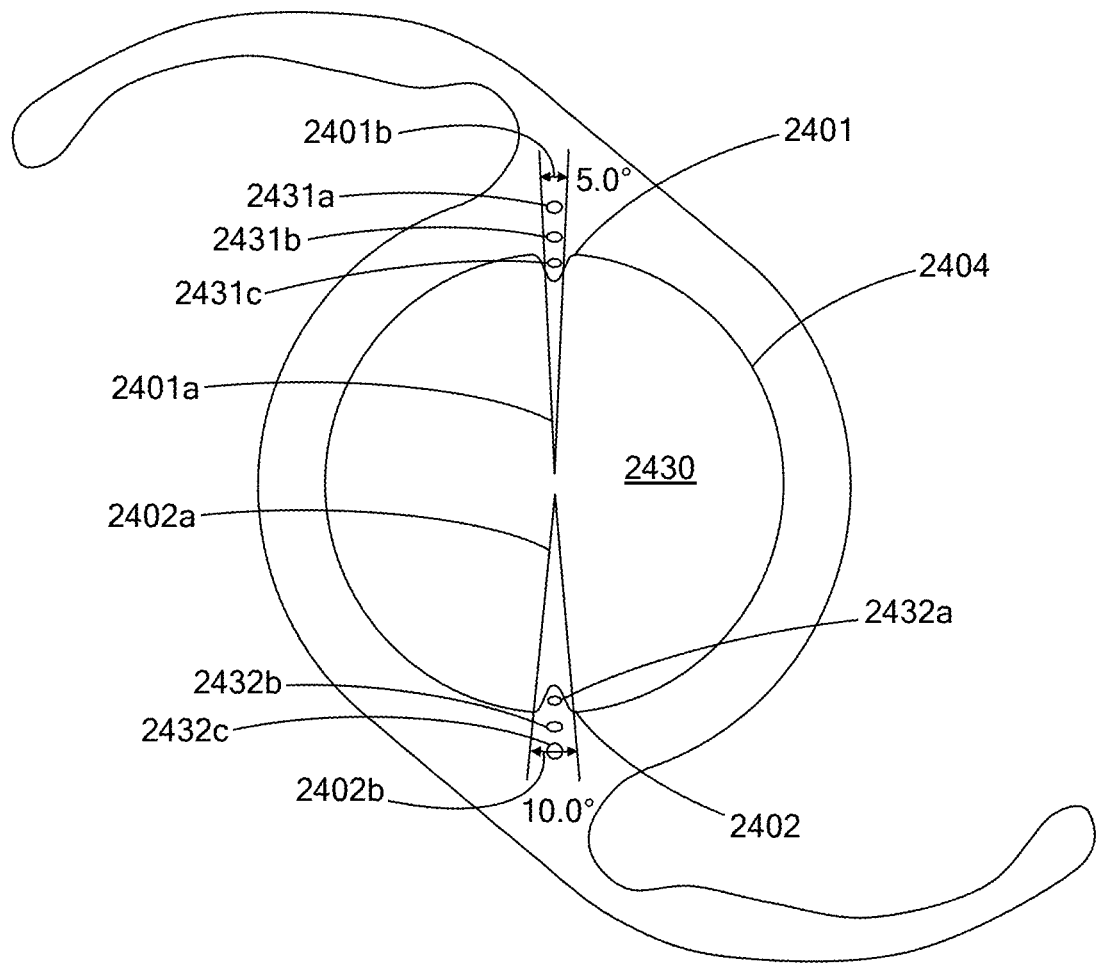
FIG. 2B is a schematic image of an embodiment of an an IOL aligned with the alignment nub capsulotomy, and cut pattern of FIG. 2A.

Turning to FIG. 2B, the capsulotomy plan of FIG. 2A now overlies a schematic of a toric IOL 2430. The toric IOL 2430 has guiding marks 2431a, 2431b, 2432c, which are aligned within nub 2401. The toric IOL 2430 has guiding marks 2432a, 2432b, 2432c that are aligned within nub 2402. The guides, e.g., 2431a, 2432a on the toric IOL (Intraocular lens) are located along the IOUs steep axis. These guiding marks are preferably so small as to not affect the patient's vision. These nubs help the surgeon (or potentially, alignment instrumentation) align the IOL for insertion into a patient's eye. The advantage of the present invention is that the surgeon may use the alignment indicators in the capsular rim 2304 to align the IOL along an axis of astigmatism (not shown). The geometries of the alignment indicators allows the surgeon to insert and align the IOL, preferably within 5° of the axis of astigmatism, and most preferably within 1° of an axis of astigmatism.

Examples of IOLs that can be used with, and will benefit from the use of the alignment nub capsulotomy would include for example, an Oculentis® IOL and an Acrysof IQ® IOL In an embodiment a relatively wide and deep nub, e.g., alignment indicator, creates a situation where the capsule pushes outwards from the eye's positive corneal pressure. In some embodiments, it may be desirable to form an alignment indicator where the capsule expands in this fashion. This expansion creates an alignment indicator with a smaller relative radius compared to the surrounding capsule's radius. The guiding marks are then aligned with the outwardly expanding nub and capsulotomy section.

Figure 3:
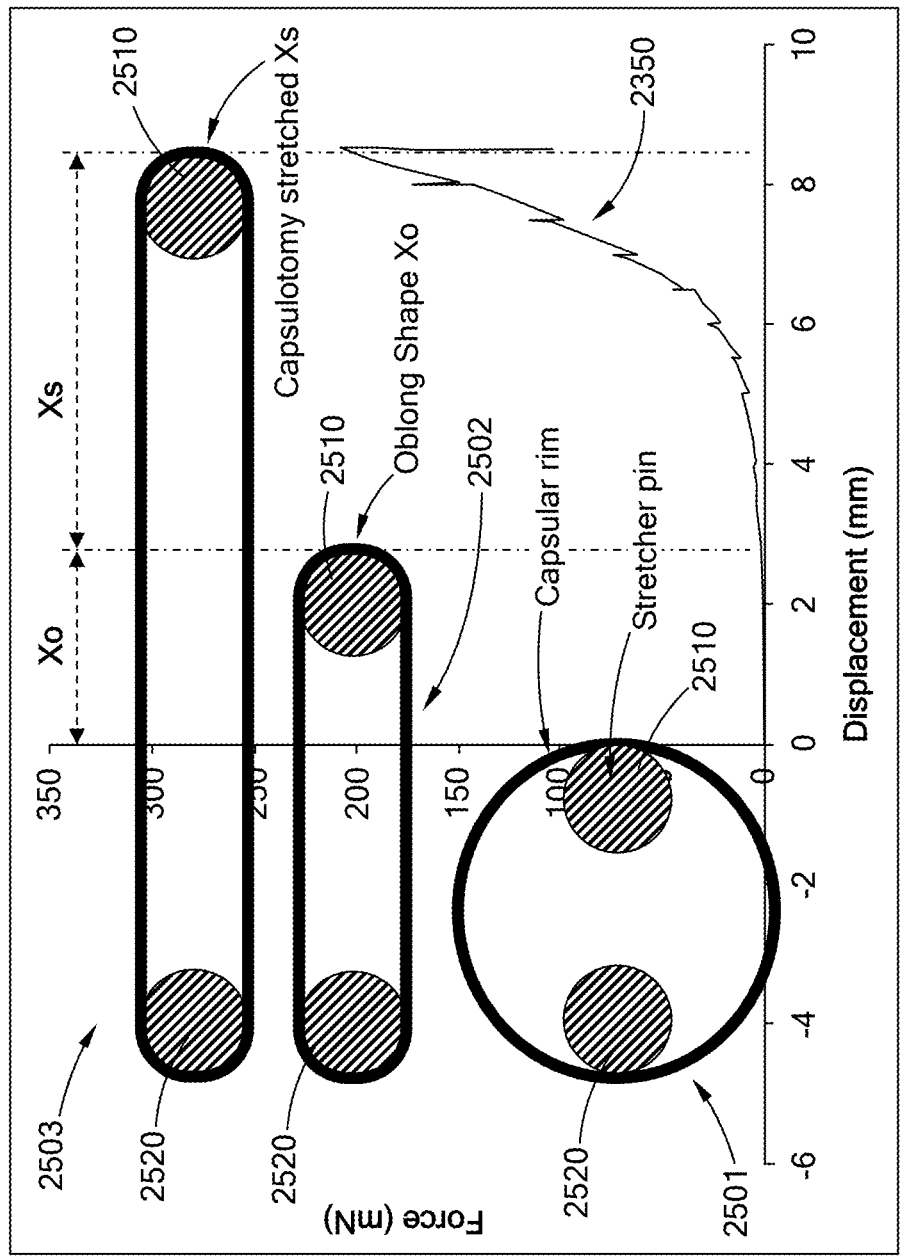
FIG. 3 is a chart depicting an embodiment of an apparatus and test procedures for determining the strength of an alignment nub capsulotomy in accordance with the present inventions.

FIG. 3 shows a stress-strain curve 2530 for tensile tests of a capsular rim 2550. In these tests, two stretcher pins 2520, 2510 are placed within a capsular rim 2550. In an initial or first position 2501, the outer edge of a stretcher pin 2510, relative to the capsule's center, is placed at what is defined as a distance of 0 mm. The opposite edge of the opposing stretching pin 2520 is placed at what is defined as −4 mm. The first stretcher pin 2510, is then moved from 0 mm up to over 8 mm at a constant rate, going through position 2502 to position 2503 is reached, where the capsule fails. The applied load varies to keep the strain rate constant. At 8.5 mm of displacement, the capsule fails at a load of approximately 210 mN. The capsule is made of a hyper-elastic material wherein the Yong's modulus increases as the capsule's displacement, or strain, increases. This effect is due to the capsule's fibers aligning as the capsule is stretched. The alignment of fibers creates a stiffer material with a higher Young's modulus. This testing methodology is useful to show that the alignment indicators of some embodiments of the present invention do not impact the capsule's overall strength.

Figure 4A:
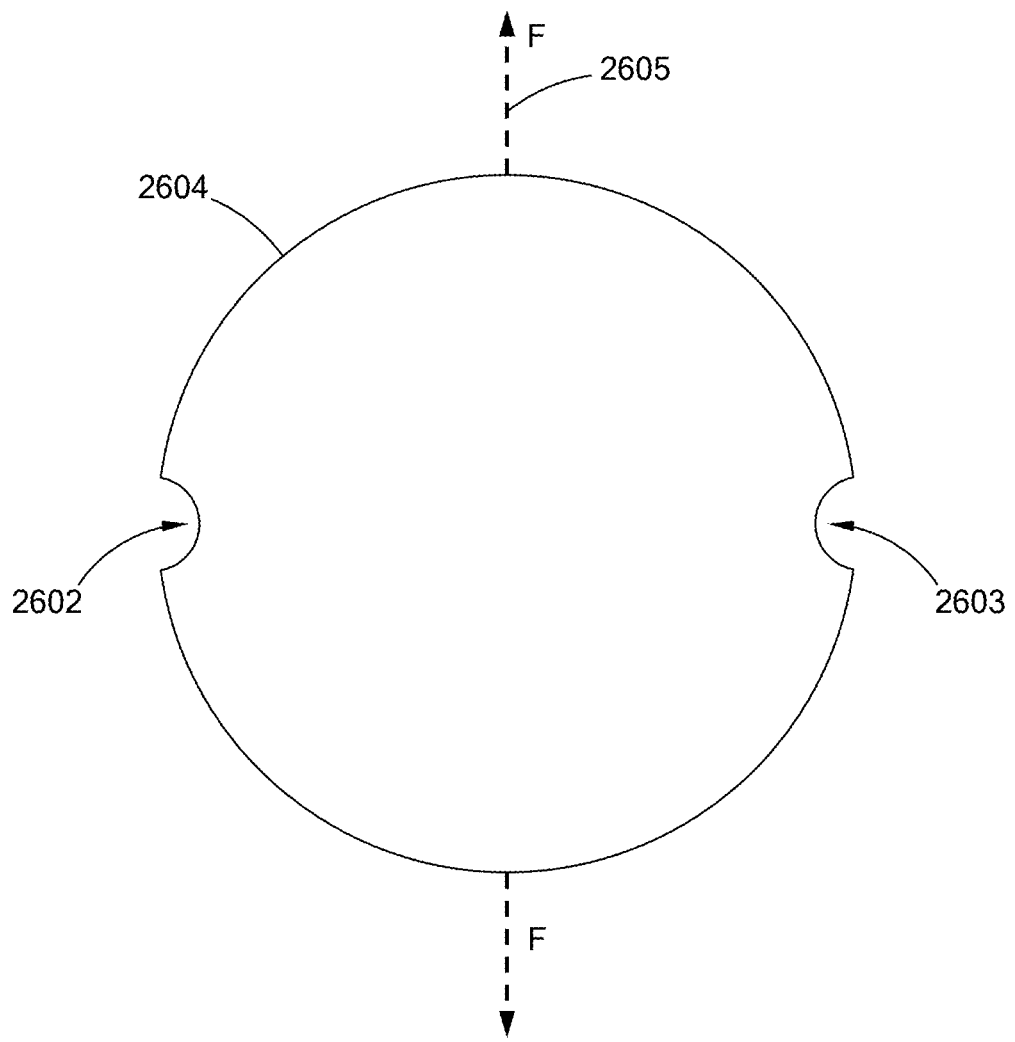
FIG. 4A is a schematic depicting transverse pull force in testing of the capsular rim strength of a nub capsulotomy in accordance with the present inventions.
Figure 4B:
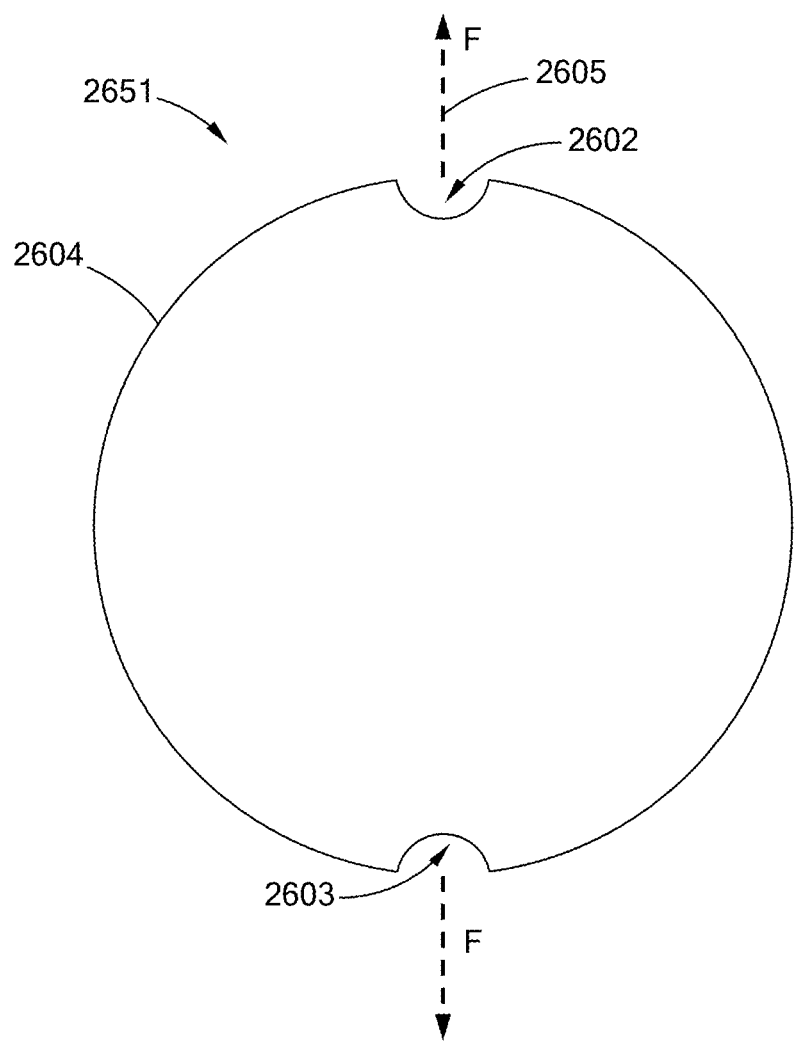
FIG. 4B is a schematic depicting axial pull force in testing of the capsular rim strength of a nub capsulotomy in accordance with the present inventions.

FIGS. 4A and 4B, schematically shows the different load orientations that can be used to test the strength of capsule 2604 with nubs, e.g., alignment indicators, 2602, 2603 cut into the capsular edge. In FIG. 4A, a load, shown by arrows F 2605, is applied across the capsular rim 2604, on a transverse (e.g., here orthogonal) axis to the axis form by, or between, nubs 2602, 2603. In FIG. 4B, load, shown by arrow F 2605, is applied axially with respect to the nubs. Thus, the force 2605 is applied across the capsular rim 2604, and in line with nubs 2602, 2603 and along the axis formed by, or between those nubs. The same stress and strains is applied with each load orientation.

Figure 5:
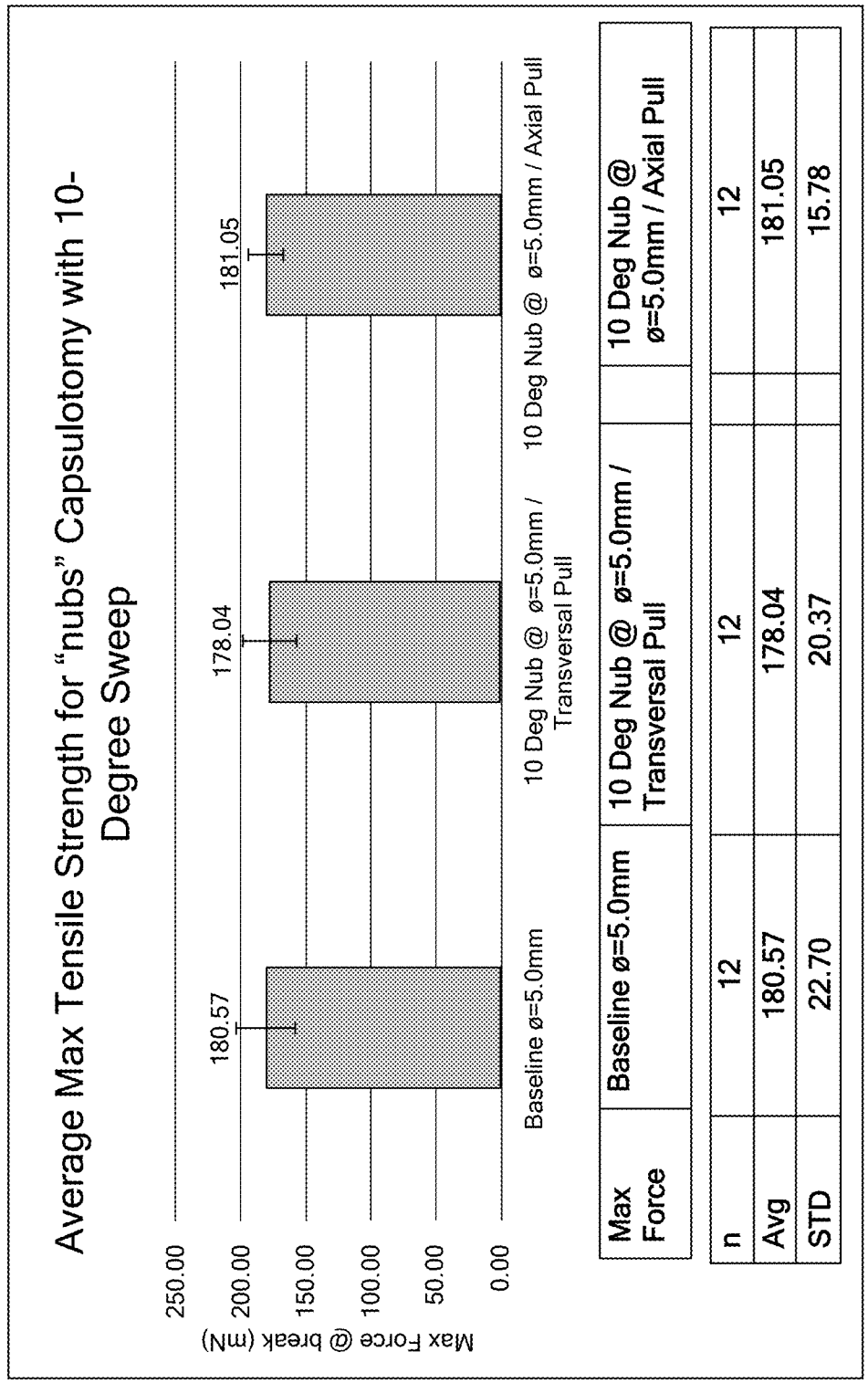
FIG. 5 is a chart of average max tensile strength for and embodiment of a nub capsulotomy with 10-degree sweep in accordance with the present inventions.

FIG. 5 shows the results of the capsule strength tests described above. Here, twenty-four (24) capsules with alignment indicators with a depth of 5 mm and a sweep of 10° were tested. Twelve (12) of those capsules were tested with transverse loads relative to the alignment indicators. And twelve (12) were tested with axial loads. Twelve additional capsules, with no alignment indicators, were tested as a control for comparison. The results are shown in the following table and charted in FIG. 5.

| Max Force | Baseline $\theta$ = 5.0 mm | 10° Nub @ $\theta$ = 5.0 mm/ Transverse Pull | 10° Nub @ $\theta$ = 5.0 mm/ Axial Pull |
|---|---|---|---|
| n | 12 | 12 | 12 |
| Avg. | 180.57 mN | 178.04 mN | 181.05 mN |
| STD | 22.7 | 20.37 | 15.78 |

Here, the average maximum load for the baseline, transverse, and axial samples were 180.57 mN, 178.04 mN, and 181.05 mN, respectively. A statistical analysis of the results show that there was no statistically significant difference with capsule strength depending on the orientation of the load or the presence of an alignment indicator. Alignment indictors therefore allow surgeons to more-accurately place IOLs without compromising the strength of the lens capsule.

In an embodiment pockets are formed in the stoma, or cornea, of the eye for the insertion of rings, or other devices. The pockets have alignment indicators formed in then, and that are aligned with an astigmatic axis of the eye, and the ring or device for insertion has alignment marks that are made on the ring or device for aligning the ring or device with the astigmatic axis of the eye, by using the alignment indicators.

As described above, the present invention allows for arcuate channels, cuts, and/or pockets to be formed in an eye for the insertion of corneal inlays, intrasomal rings, or IOLs. In some embodiments of the invention, alignment indicators are automatically generated within 10° of an astigmatic axis as part of the surgical plan. During the capsulotomy, a therapeutic laser then cuts the capsule, according to the surgical plan, and forms the alignment indicators, along with a pocket for an IOL. A surgeon then may use guiding marks on the IOL to insert the IOL into the eye wherein the alignment indicators are in line with the IOUs guiding marks. Preferably, these guiding marks are along the steep axis of an IOL. This allows the IOL to be aligned within 5° or less of the astigmatic axis, which allows for the correction of astigmatism, including surgically-induced astigmatism which may arise from the removal of the natural crystalline lens and replacement with an IOL.

The various embodiments of devices, systems, laser shot patterns, activities, and operations set forth in this specification may be used with, in or by, various measuring, diagnostic, surgical and therapeutic laser systems, in addition to those embodiments of the Figures and disclosed in this specification. The various embodiments of devices, systems, laser shot patterns, activities, and operations set forth in this specification may be used with: other measuring, diagnostic, surgical and therapeutic systems that may be developed in the future: with existing measuring, diagnostic, surgical and therapeutic laser systems, which may be modified, in-part, based on the teachings of this specification; and with other types of measuring, diagnostic, surgical and therapeutic systems. Further, the various embodiments of devices, systems, laser shot patterns, activities, and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The inventions may be embodied in other forms than those specifically disclosed herein without departing from their spirit or essential characteristics. The described embodiments are to be considered in all respects only as illustrative and not restrictive.

What is claimed:

1. A system for performing an opening in a structure of the eye for inserting an intraocular device into the eye, the system comprising:
    a. a therapeutic laser for generating a therapeutic laser beam;
    b. data identifying the position of an astigmatic axis of an eye;
    c. an alignment nub laser capsulotomy laser shot pattern for delivery of the therapeutic laser beam to an anterior capsule of a lens of the eye, the pattern comprising a capsulotomy pattern defining a center of the pattern, wherein the capsulotomy pattern comprising a first and a second nub, wherein the nubs are aligned with the astigmatic axis of the eye; and,
    d. the nubs extend inwardly toward the center of the pattern, and the nubs define a depth of about 0.1 mm to about 1 mm, a sweep of about 5° to about 35°, and a fillet of about 0.1 mm to about 0.7 mm.

2. The system of claim 1, wherein the nubs are on the astigmatic axis.

3. The system of claim 2, wherein upon delivery of the laser beam pattern to the lens capsule of the eye, a capsular rim is formed having a strength of about 178 to about 182 mN.

4. The system of claim 1, wherein the nubs are within 5° of the astigmatic axis.

5. The system of claim 4, wherein the sweep is about 5° to about 10°, whereby the nubs, upon being formed in the lens capsule, enable a qualitative alignment of a toric IOL in the capsule of the lens of the eye.

6. The system of claim 5, wherein upon delivery of the laser beam pattern to a lens capsule of an eye, a capsular rim is formed having a strength of about 178 to about 182 mN.

7. The system of claim 4, wherein upon delivery of the laser beam pattern to the lens capsule of the eye, a capsular rim is formed having a strength of about 178 to about 182 mN.

8. The system of claim 1, wherein the nubs are within 10° of the astigmatic axis.

9. The system of claim 1, wherein upon delivery of the laser beam pattern to a lens capsule of the eye, a capsular rim is formed having a strength of about 180 mN.

10. The system of claim 1, wherein the astigmatic axis is an induced astigmatic axis.

11. The system of claim 1, wherein the astigmatic axis is determined before the removal of the natural human lens of the eye.

12. A method of aligning a laser shot pattern to an anterior surface of a lens capsule of an eye, the method comprising:
    a. providing to a laser system data for a position of an astigmatic axis of an eye;
    b. aligning a laser beam shot pattern with the astigmatic axis of the eye; and,
    c. wherein the laser beam shot pattern comprising an alignment nub laser capsulotomy laser shot pattern for delivery of the therapeutic laser beam to an anterior capsule of a lens of the eye, the pattern comprising a capsulotomy pattern defining a center of the pattern, wherein the capsulotomy pattern comprising a first and a second nub, and wherein the nubs extend inwardly toward the center of the pattern, and the nubs define a depth of about 0.1 mm to about 1 mm, a sweep of about 5° to about 35°, and a fillet of about 0.1 mm to about 0.7 mm;
    d. whereby nubs are aligned with the position of the astigmatic axis of the eye.

13. The method of claim 12, wherein the nubs are on the astigmatic axis.

14. The method of claim 12, wherein the nubs are within 5° of the astigmatic axis.

15. The methods of claim 14, wherein the sweep is about 5° to about 10°, whereby the nubs, upon being formed in the lens capsule, enable a qualitative alignment of a toric IOL in the capsule of the lens of the eye.

16. The method of claim 12, wherein the nubs are within 10° of the astigmatic axis.

17. The method of claim 12, wherein upon delivery of the laser beam pattern to a lens capsule of the eye, a capsular rim is formed having a strength of about 180 mN.

18. The method of claim 12, wherein upon delivery of the laser beam pattern to the lens capsule of the eye, a capsular rim is formed having a strength of about 178 to about 182 mN.

19. The method of claim 12, wherein the astigmatic axis is an induced astigmatic axis.

20. A method of delivering a laser shot pattern to an anterior surface of a lens capsule of an eye, the method comprising:
    a. providing to a laser system data for a position of an astigmatic axis of an eye;
    b. aligning a laser beam shot pattern with the astigmatic axis of the eye;
    c. wherein the laser beam shot pattern comprising an alignment nub laser capsulotomy laser shot pattern for delivery of the therapeutic laser beam to an anterior capsule of a lens of the eye, the pattern comprising a capsulotomy pattern defining a center of the pattern, wherein the capsulotomy pattern comprising a first and a second nub, and wherein the nubs extend inwardly toward the center of the pattern, and the nubs define a depth of about 0.1 mm to about 1 mm, a sweep of about 5° to about 35°, and a fillet of about 0.1 mm to about 0.7 mm;
d. whereby nubs are aligned with the position of the astigmatic axis of the eye; and,
e. delivering a therapeutic laser beam in the laser beam shot pattern to the anterior surface of the capsule of the lens, thereby forming an alignment nub capsulotomy.

21. The method of claim 20, comprising aligning a mark on a toric IOL with at least one nub in the alignment nub capsulotomy.

* * * * *